US008947697B2

(12) United States Patent
Gurcan et al.

(10) Patent No.: US 8,947,697 B2
(45) Date of Patent: Feb. 3, 2015

(54) PRINTING DIRECT2D-RENDERED ITEMS

(75) Inventors: Ahmet Gurcan, Mercer Island, WA (US); Herman Widjaja, Issaquah, WA (US); Georgi Chakalov, Duvall, WA (US); Arindam Basak, Hyderabad (IN); Hristo Ivanov, Bellevue, WA (US); Kanwal Vedbrat, Bellevue, WA (US); Adam Knauff, Port Orchard, WA (US); Jianye Lu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 12/817,768

(22) Filed: Jun. 17, 2010

(65) Prior Publication Data

US 2011/0310427 A1     Dec. 22, 2011

(51) Int. Cl.
*G06F 3/12* (2006.01)

(52) U.S. Cl.
CPC ............ *G06F 3/1284* (2013.01); *G06F 3/1206* (2013.01); *G06F 3/1247* (2013.01)
USPC ...................................... 358/1.15

(58) Field of Classification Search
USPC ...................................... 358/1.15
See application file for complete search history.

(56) References Cited

U.S. PATENT DOCUMENTS

| 5,936,614 A | 8/1999 | An et al. |
| 2003/0193484 A1 | 10/2003 | Lui et al. |
| 2005/0110769 A1 | 5/2005 | DaCosta et al. |
| 2008/0186516 A1 | 8/2008 | Tayama |
| 2009/0147308 A1 | 6/2009 | Hasegawa |
| 2009/0219550 A1 | 9/2009 | Levin |
| 2009/0279122 A1 | 11/2009 | Armstrong |
| 2010/0079474 A1* | 4/2010 | Sridharanarayanan et al. ............ 345/553 |

OTHER PUBLICATIONS

Firefox to Get Direct2D Rendering, Out of Process Plugins—Published Date: Apr. 6, 2010 http://www.techpowerup.com/119443/Firefox_to_Get_Direct2D_Rendering_Out_of_Process_Plugins.html.
XPS and Color Printing Enhancements in Microsoft Windows Vista—Published Date: Dec. 17, 2007 http://download.microsoft.com/download/9/c/5/9c5b2167-8017-4bae-9fde-d599bac8184a/Vista_print.docx.
Printing Overview_Retrieved Date: May 6, 2010 http://msdn.microsoft.com/en-us/library/ms742418.aspx.
Non-Final Office Action mailed Jul. 11, 2013 re U.S. Appl. No. 12/619,373 14 pgs, 5 cited references.

* cited by examiner

*Primary Examiner* — Qian Yang
(74) *Attorney, Agent, or Firm* — Timothy Churna; Raghu Chinagudabha; Micky Minhas

(57) ABSTRACT

Technology described herein is directed to converting display-rendering instructions (e.g., DIRECT2D) into print-rendering instructions (e.g., EMF, WMF, XPS, and SVG). For example, a request to print an item (e.g., document) is received, the item being displayable on an output device when display-rendering instructions are executed. A print render target is created that includes an instructions converter. The display-rendering instructions are routed to the print render target. The instructions converter maps the display-rendering instructions to the print-rendering instructions, which are usable to print the item.

10 Claims, 3 Drawing Sheets

PRINTING DIRECT2D-RENDERED ITEMS

BACKGROUND

An application programming interface that leverages functionality of a graphics card or other component often allows for creation of high-quality display renderings. However, if the application programming interface does not also allow for interaction with a printing component then the display renderings might not be printable without modifying display-rendering instructions. This can prevent developers from re-using display-rendering instructions for printing the display renderings.

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

Technology described herein is directed to converting display-rendering instructions into print-rendering instructions. A request to print an item is received, the item being displayable on an output device when display-rendering instructions are executed. A print render target is created that includes an instructions converter and the display-rendering instructions are routed to the print render target. The instructions converter maps the display-rendering instructions to the print-rendering instructions.

BRIEF DESCRIPTION OF THE DRAWINGS

Illustrative embodiments are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of the claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Generally, embodiments of the present invention are directed to converting display-rendering instructions into print-rendering instructions. As used herein, the phrase "display-rendering instructions" describes code (e.g., primitives) that, when executed by a computing device, enable the computing device to cause a depiction of an item to be displayed. For example, a depiction might be displayed on a monitor and an item might include a webpage, a word-processing document, or an element (e.g., graphic) of a webpage or word-processing document. Often display-rendering instructions leverage hardware (e.g., graphics card) capabilities in order to generate a displayable rendering of an item. As a result, the display-rendering instructions might not include sufficient instructions to generate a printable rendering of an item, such that executing the display-rendering instructions alone will not enable a computing device to cause a depiction of an item to be printed. An example of display-rendering instructions includes instructions or primitives that are written in a format that leverages a DIRECT2D application programming interface (API). Such instructions that leverage the DIRECT2D API are referred to herein as "DIRECT2D instructions." Accordingly, an embodiment of the present invention is directed to converting display-rendering instructions into a form that is usable for printing scenarios.

As used herein, the phrase "print-rendering instructions" describes code that, when executed by a computing device, enable the computing device to cause a depiction of an item to be printed on a print surface (e.g., printed on paper). Print-rendering instructions might include various formats, such as an Enhanced Metafile (EMF) format, a Windows Metafile (WMF) format, a Scalable Vector Graphics (SVG) format, an XML Paper Specification (XPS) format, or a combination thereof. Print-rendering instructions are typically combined with print-formatting instructions (e.g., pagination) that instruct how the content, which is represented by the print-rendering instructions, is to be laid out on a print surface.

Figure 1:
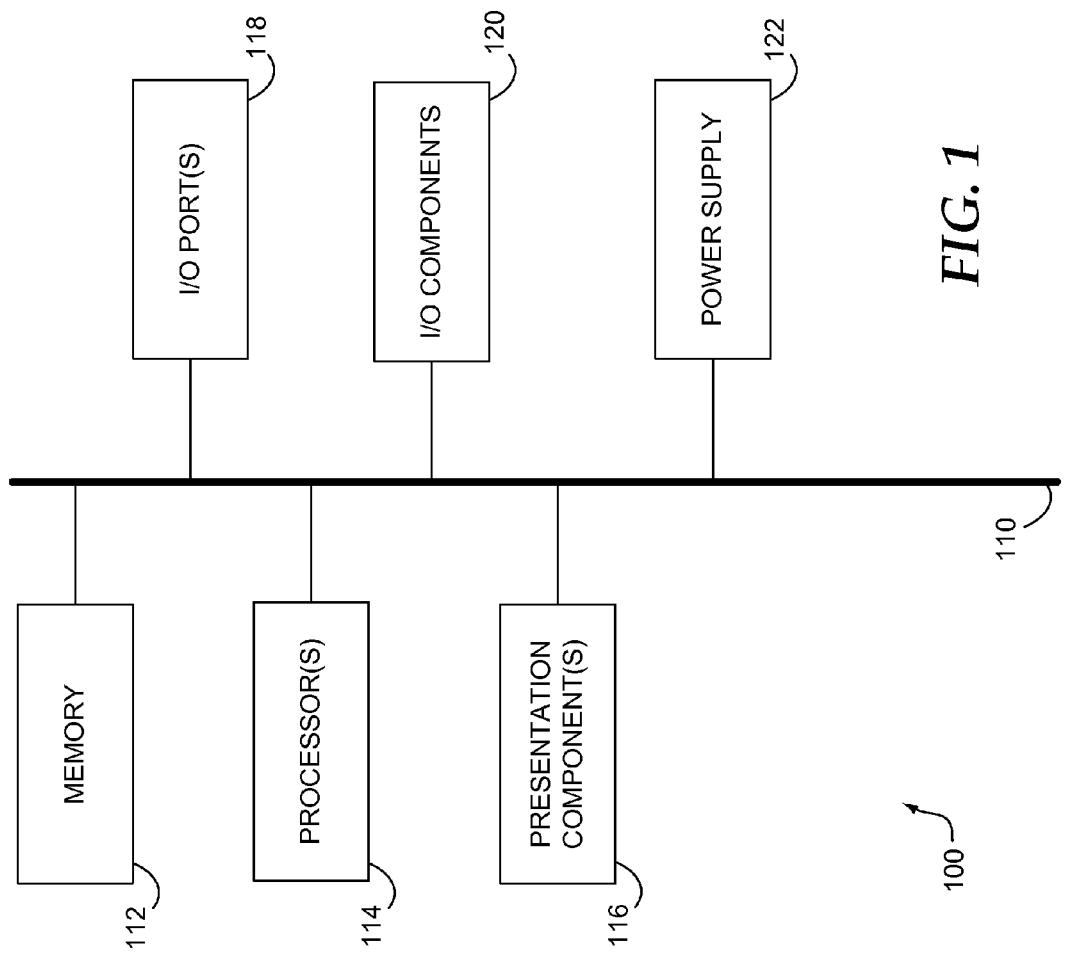
FIG. 1 is a block diagram depicting an exemplary computing device suitable for use in accordance with embodiments of the invention.

Having briefly described embodiments of the present invention, FIG. 1 is now described in which an exemplary operating environment for implementing embodiments of the present invention is shown and designated generally as computing device 100. Computing device 100 is but one example of a suitable computing environment and is not intended to suggest any limitation as to the scope of use or functionality of invention embodiments. Neither should the computing device 100 be interpreted as having any dependency or requirement relating to any one or combination of components illustrated.

Embodiments of the invention might be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention might be practiced in a variety of system configurations, including handheld devices, consumer electronics, general-purpose computers, more specialty computing devices, etc. Embodiments of the invention might also be practiced in distributed computing environments where tasks are performed by remote-processing devices that are linked through a communications network.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-usable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

With reference to FIG. 1, computing device 100 includes a bus 110 that directly or indirectly couples the following devices: memory 112, one or more processors 114, one or more presentation components 116, input/output ports 118, input/output components 120, and a power supply 122. Bus 110 represents what might be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
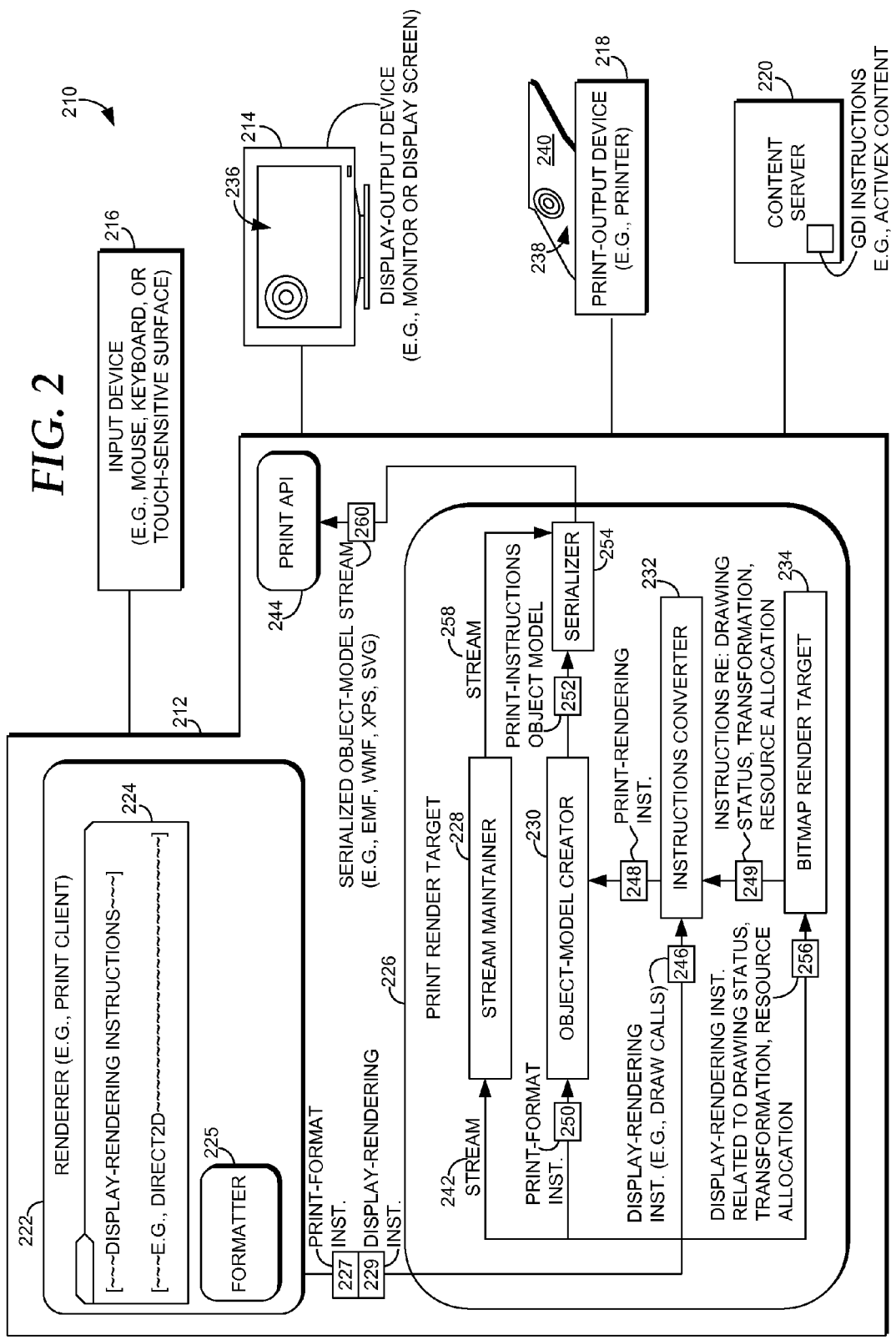
FIG. 2 is a block diagram of an exemplary operating environment in accordance with an embodiment of the present invention.

Referring now to FIG. 2, an exemplary operating environment suitable for practicing an embodiment of the invention is depicted and identified generally by reference numeral 210. Environment 210 includes a computing device 212 (similar to computing device 100 of FIG. 1), which communicates with a display-output device 214, an input device 216, a print-output device 218, and a content server 220. FIG. 2 indicates that an exemplary display-output device 214 includes a monitor or a display screen; an exemplary input device 216 includes a mouse, a keyboard, or a touch-sensitive surface; and an exemplary print-output device 218 includes a printer. Content server 220 might communicate with computing device 212 by way of a network, such as the Internet.

Computing device 212 functions to render (e.g., display and print) various types of content. For example, computing device 212 might render a document that is created and stored locally using an application running on computing device 212. In such a scenario, display-rendering instructions 224 (e.g., DIRECT2D instructions) might represent code that, when executed, enable computing device 212 to display the document. In another embodiment, computing device 212 communicates with content server 220 to receive content. For example, content server 220 might provide to computing device 212 a set of instructions that, when executed by computing device 212, enable computing device 212 to render a requested piece of content on display-output device 214 or print-output device 218. Instructions received from content server 220 might include various formats, such as DIRECT 2D and GDI. For example, GDI instructions are often used to code for ActiveX® controls, whereas DIRECT2D might be used to code for other two-dimensional graphics of a webpage. In an exemplary embodiment, display-rendering instructions 224 were received from content server 220 when a webpage was requested by renderer 222 (e.g., print client).

In an exemplary embodiment, computing device 212 communicates with display-output device 214 (e.g., monitor or display screen) to cause visual representations to be displayed. For example, computing device 212 might include renderer 222 that causes an item 236 (e.g., word-processing document, web document, or graphic thereof) to be displayed on display-output device 214 when display-rendering instructions 224 are executed. That is, for description purposes herein, display-rendering instructions 224 provide instructions to computing device 212 regarding how to display item 236. Although exemplary item 236 refers to an entire document, in other embodiments of the present invention an item that is rendered includes a single graphic. An exemplary renderer 222 includes a print client, and as previously indicated, in one embodiment display-rendering instructions 224 include DIRECT2D instructions. Although this description describes scenarios in which display-rendering instructions 224 are for a webpage provided by content server 220, in other embodiments display-rendering instructions 224 might be for a nonweb document, such as a word-processing document.

Computing device 212 also communicates with input device 216 to receive instructions from a user, such as a request to print item 236 that is displayed when display-rendering instructions 224 are executed and that is presented on the display-output device 214. Absent this invention, computing device 212 might be unable to print item 236, because item 236 is rendered by executing display-rendering instructions 224, such as DIRECT2D instructions, which do not include necessary print-specific instructions. However, in an embodiment of the invention, display-rendering instructions 224 are converted to a form that is usable for print scenarios.

In one embodiment of the present invention, computing device 212 includes a PrintRenderTarget 226, which is created by computing device 212 when a request to print item 236 is received. PrintRenderTarget 226 includes various components including a stream maintainer 228, an object-model creator 230, an instructions converter 232, and a BitmapRenderTarget 234, each of which are described in more detail below. Generally, PrintRenderTarget 226 functions to intercept draw calls that instruct computing device 212 to render item 236 on display-output device 214. The intercepted draw calls are converted to a format that allows the computing device 212 to cause item 238 to be rendered on print surface 240.

When a request is received to print item 236 (which is represented by display-render instructions 224), in addition to creating PrintRenderTarget 226, formatter 225 determines a set of print-format instructions 227. That is, as previously described, often display-render instructions 224 do not include necessary print-specific instructions, since display-render instructions 224 are designed to leverage hardware capabilities to generate a screen-display rendering. Screen-display renderings do not require certain instructions, such as pagination, which are required to render on a print surface. Accordingly, formatter 225 determines appropriate print-format instructions 227 that apply to display-rendering instructions 229 and that are also sent to PrintRenderTarget 226 in parallel with display-rendering instructions 229. In one embodiment, renderer 222 includes a print client that functions to determine print-specific instructions.

In an embodiment, when PrintRenderTarget 226 is created, a stream 242 (e.g., IStream) is provided. The stream is utilized to serialize instructions that have been converted and to communicate serialized contents to a print API 244. Stream maintainer 228 functions to maintain the stream while instructions are being converted and assembled by other components of PrintRenderTarget 226.

In a further embodiment, instructions converter 232 maps display-rendering instructions 246 (e.g., DIRECT2D instructions) to print-rendering instructions 248. Exemplary print-rendering instructions might include EMF primitives/resources, WMF primitives/resources, SVG primitives/resources, and/or XPS primitives/resources. After mapping, instructions converter 232 issues print-rendering instructions 248 to object-model creator 230 (described in more detail below) to be assembled with other instructions for printing.

When mapping display-rendering instructions 246 to print-rendering instructions 248, instructions converter 232 applies various conversion rules. In an embodiment in which print-rendering instructions 248 include XPS primitives and resources, exemplary conversion rules are depicted in Table 1.

TABLE 1

| Display-rendering instruction (e.g., Direct2D draw calls) | Print-rendering instruction (e.g., XPS primitives/resources) |
|---|---|
| CreateMesh( ) | Convert the ID2D1Mesh into XPS paths |
| DrawBitmap( ) | Create a trivial XPS OM path and fill it with an image brush |
| DrawEllipse( ), DrawGeometry( ), DrawLine( ), DrawRectangle( ), DrawRoundedRectangle( ) | First create an ID2D1 geometry if necessary, then convert the geometry into XPS path(s) and the ID2D1 brush into an XPS brush, finally apply the XPS brush to the XPS path(s) |
| FillEllipse( ), FillGeometry( ), FillMesh( ), FillRectangle( ), FillRoundedRectangle( ) | First create an ID2D1 geometry if necessary, then convert the geometry into XPS path(s) and the ID2D1 brush into an XPS brush, finally fill the XPS path(s) with the XPS brush |
| FillOpacityMask( ) | First convert an ID2D1 fill brush to an XPS brush and use it as fill brush of XPS path generated from the destination rectangle; then convert an ID2D1 opacity mask bitmap to an XPS image brush and use it as opacity mask (via OpacityMask attribute) for the same XPS path |
| DrawGlyphRun | Convert glyphs to XPS path if fonts not embeddable; otherwise, convert glyphs to XPS OM glyphs |

TABLE 1-continued

| Display-rendering instruction (e.g., Direct2D draw calls) | Print-rendering instruction (e.g., XPS primitives/resources) |
|---|---|
| DrawText( ), DrawTextLayout( ) | create IDwriteTextLayout if necessary, then convert text layout to a set of XPS glyphs (for glyph runs with embeddable font), XPS line paths (for underlines and strikethroughs), and more complex paths (for glyph runs with nonembeddable fonts); all these are XPS visuals grouped together in an XPS canvas |
| PopLayer( ), PushLayer( ) | Convert D2D1Layer to IXpsOMCanvas with attributes properly set; maintain a stack of such canvases; all XPS visuals will be directed to the current canvas (aka the canvas at the top of stack) if the canvas stack is not empty, until the top canvas is popped out |
| PopAxisAlignedClip( ), PushAxisAlignedClip( ) | Convert clip rectangle as an ID2D1 layer, which limits draw calls to that rectangle only, until that layer is popped out |

In a further embodiment, for any incoming ID2D1Bitmap that is received as part of display-rendering instructions 246, instructions converter 232 draws its bits to an intermediate IWICBitmap, then converts it to a printing-instructions object-model image resource before that image is embedded into the print-instructions object model. This enables PrintRenderTarget 226 to incorporate any bitmap from a print client to the object model without knowing what source(s) that bitmap comes from.

In another embodiment, PrintRenderTarget 226 creates a BitmapRenderTarget 234, to which PrintRenderTarget 226 directs display-rendering instructions 256 related to drawing status, transformation, and resource allocation. BitmapRenderTarget 234 then serves as a manager from which instructions converter 232 can retrieve those instructions 249 when needed. An exemplary interface that relates to general drawing includes: BeginDraw( ), EndDraw( ), Flush( ). An exemplary interface related to resources (e.g., bitmap, brush, layer) includes: CreateBitmap( ), CreateBitmapBrush( ), CreateBitmapFromWicBitmap( ), CreateCompatibleRenderTarget( ), CreateGradientStopCollection( ), CreateLayer( ), CreateLinearGradientBrush( ), CreateRadialGradientBrush( ), CreateSharedBitmap( ), CreateSolidColorBrush. An exemplary interface related to mode and status includes: GetAntialiasMode( ), GetTextAntialiasMode( ), GetTextRenderingParams( ), IsSupported( ), SetTextAntialiasMode( ), SetTextRenderingParams( ), RestoreDrawingState( ), SaveDrawingState( ), SetAntialiasMode( ). An exemplary interface that relates to transformation includes: GetTransform( ), SetTransform( ).

When converting from display-rendering instructions 246 to print-rendering instructions 248, a few interfaces might require processing by PrintRenderTarget 226. For example, "GetDpi( ), SetDpi( )" might invoke a default 96 DPI for XPS files, thereby ignoring any user DPI setting. In another embodiment, "GetPixelFormat( )" returns D2D1::PixelFormat(DXGI_FORMAT_R8G8B8A8_UNORM_SRGB, D2D1_ALPHA_MODE_PREMULTIPLIED). Furthermore, "GetPixelSize( ), GetSize( )" might return a user-defined page size, and "GetMaximumBitmapSize( )" might return a maximum supported bitmap size (e.g., 4 MB). Also, if PrintRenderTarget 226 does not support the use of tags, "GetTags( ), SetTags( )" might be processed such that tags are designed to be printed by debug error messages.

PrintRenderTarget 226 also includes object-model creator 230, which creates, assembles, and forwards an object model to be serialized into a stream 258. That is, upon receiving a StartPage( ) command, object-model creator 230 creates and initiates a print-instructions object model. A StartPage( ) command might be received as part of print-format instructions 250. Exemplary print-instructions object models include fixed-page documents, which might include EMF, WMF, XPS, or SVG. After creating and initiating the print-instructions object model, object-model creator 230 continues to assemble the print-instructions object model as it receives print-rendering instructions 248 (e.g., primitives and resources) from instructions converter 232. Upon receiving an EndPage( ) command (also received as part of print-format instructions 250), object-model creator 230 issues print-instructions object model 252 to a serializer 254. In an exemplary embodiment, a print client (i.e., renderer 222) issues print tickets as a parameter in a document and page calls to specify a printing configuration. Such print tickets might be received as part of print-format instructions 250, such that object-model creator 230 properly inserts the print ticket in a created print-instructions object model, either at document level, at page level, or both.

When executing tasks, object-model creator 230 might apply various rules. In an embodiment in which object-model creator 230 creates an XPS object model, exemplary rules are depicted in Table 2.

TABLE 2

| Instruction | Function Executed |
| --- | --- |
| StartDocument( ), EndDocument( ) | create XPS writing stream with document-level print ticket at the beginning for a print job, and close XPS stream when the print job is done |
| StartPage( ), EndPage( ) | Create an XPS object model fixed page model; stream out XPS visuals, font/image resources, and page-level print ticket when the page is ready |

As described previously, upon completing assembly of a print-instructions object model 252 (e.g., upon receiving an EndPage( ) command), object-model creator 230 issues print-instructions object model 252 to serializer 254 to be incorporated into a stream 242. Serializer 254 sequences an object-model stream 260, which is communicated from serializer 254 to a print API 244. Object-model stream 260 might include various formats, such as EMF, WMF, XPS, and SVG, and print API 244 is designed to function with the format (e.g., EMF, WMF, XPS, and SVG) of object-model stream 260. That is, if object-model stream 260 is an XPS stream, print API 244 is an XPS print API. Print API 244 facilitates interaction between object-model stream 260 and print-output device 218, thereby enabling print-output device 218 to print an item (e.g., item 238), which is represented by instructions in object-model stream 260. As such, upon completing assembly of one page-to-be-printed into print-instructions object model 252, the object-model creator 230 issues the object model to serializer 254, which passes the sequenced object-model stream 260 to print API 244. This allows the assembled page-to-be-printed to be printed while a subsequent page-to-be-printed is being assembled.

Figure 3:
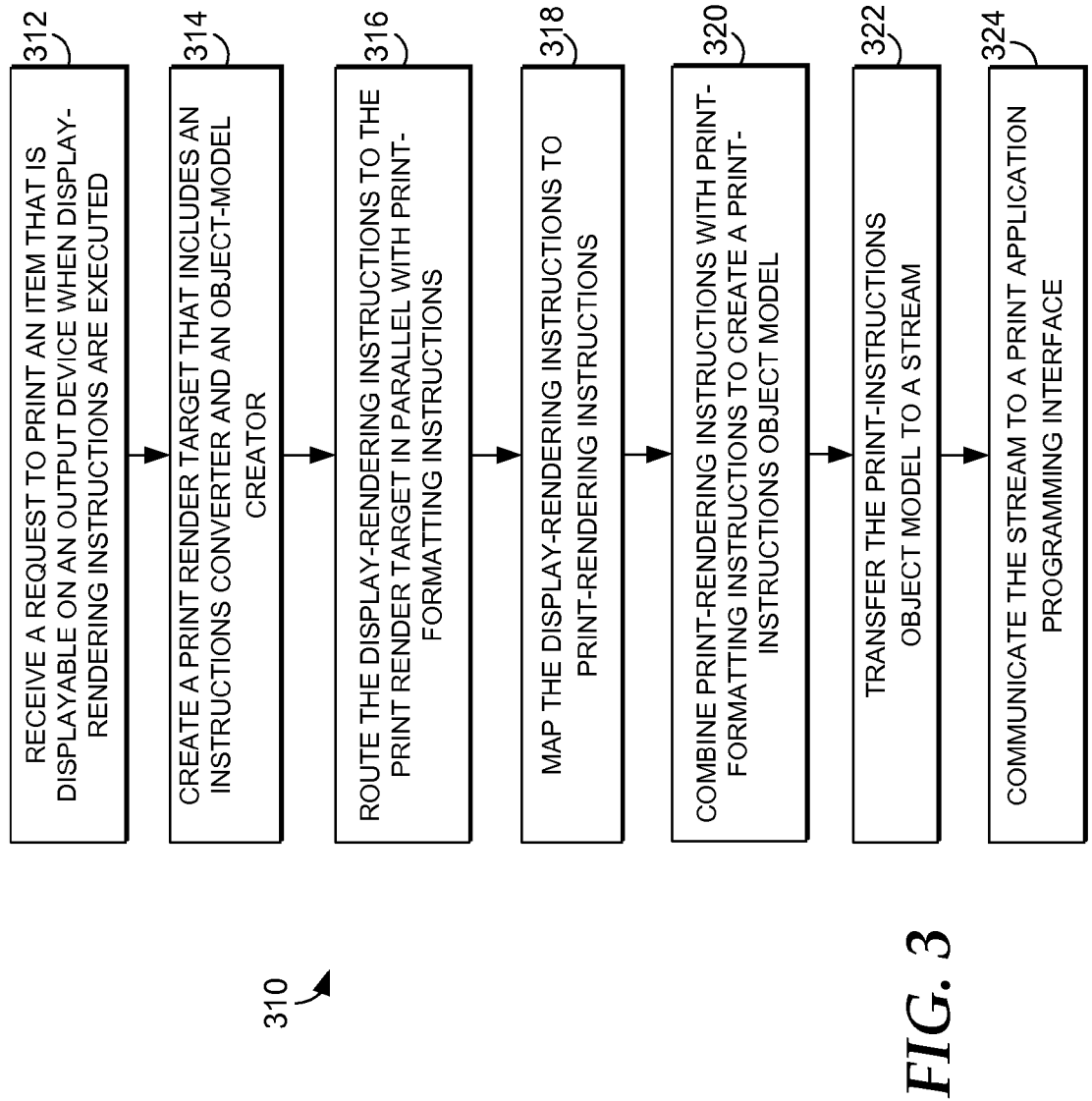
FIG. 3 is an exemplary flow diagram in accordance with an embodiment of the present invention.

Using above-described components, an embodiment of the present invention includes a method of converting display-rendering instructions into print-rendering instructions. For example, the method might be facilitated upon the execution of computer-executable instructions, which are stored on one or more computer-readable media. One such method is represented in FIG. 3 as a flow diagram and is identified generally as method 310. In explaining FIG. 3, reference is made to FIG. 2 for illustrative purposes.

At step 312, method 310 includes receiving a request to print an item that is displayable on an output device when display-rendering instructions (e.g., DIRECT2D instructions) are executed. For example, using input device 216 a user might submit to computing device 212 a request to print item 236 (e.g., document) that is presented on display-output device 214 when display-rendering instructions 224 are executed. In another embodiment, item 236 might include a document having content that is rendered by executing both DIRECT2D instructions and GDI instructions 262.

At step 314, method 310 includes creating a PrintRender-Target that includes an instructions converter and an object-model creator. For example, receiving a request to print might prompt computing device 212 to create PrintRenderTarget 226, which includes instructions converter 232 and object-model creator 230. Receiving a request to print might also prompt formatter 225 to determine print-formatting instructions (e.g., pagination). Step 316 includes, routing the display-rendering instructions to the print render target in parallel with print-formatting instructions. For example, display-rendering instructions 229 are routed to PrintRenderTarget 226 in parallel with print-formatting instructions 227. In a scenario in which item 236 includes content that is rendered by executing both GDI instructions and DIRECT2D instructions, display-rendering instructions 229 include the GDI instructions and DIRECT2D instructions, which are sent in parallel with print-formatting instructions 227.

At step 318 method 310 includes mapping by the instructions converter the display-rendering instructions to the print-rendering instructions. For example, instructions converter 232 maps display-rendering instructions 246 to print-rendering instructions 248. In one embodiment, instructions converter 232 applies conversion rules that are depicted in Table 1. Moreover, in a scenario in which item 236 includes content that is rendered by executing GDI instructions and DIRECT2D instructions, instructions converter 232 maps both the GDI instructions and the DIRECT2D instructions to print-rendering instructions 248. As such, instructions converter 232 might include only one component having multiple conversion functions. Alternatively, instructions converter 232 might include multiple components, each responsible for converting a particular format of display-rendering instructions into respective print-rendering instructions, which are combined into one set of print-rendering instructions. As discussed previously, print-rendering instructions might include various formats, such as EMF, WMF, SVG, and XPS.

Step 320 includes combining by the object-model creator the print-rendering instructions with the print-formatting instructions to create a print-instructions object model. For example, object-model creator 230 combines print-rendering instructions 248 with print-formatting instructions 250 to create print-instructions object model 252. Exemplary object models include EMF, WMF, SVG, and WPS. At step 322 the print-instructions object model is transferred to a stream for serialization. For example, print-instructions object model 252 is issued to serializer 254, which sequences object model 252 into stream 258. At step 324 the stream is communicated to a print application programming interface. For example, stream 260 is passed to print API 244, which facilitates interaction with print-output device 218.

One embodiment includes a method of converting display-rendering instructions into print-rendering instructions. The method includes receiving a request to print an item that is displayable on an output device when the display-rendering instructions are executed. In addition, a print render target is created that includes an instructions converter, and the display-rendering instructions are routed to the print render target. Furthermore, the instructions converter maps the display-rendering instructions to the print-rendering instructions.

A further embodiment includes one or more computer-readable media having computer executable instructions stored thereon that, when executed, facilitate a method of converting display-rendering instructions into print-rendering instructions. The method includes receiving a request to print an item that is displayable on an output device when DIRECT2D instructions are executed and creating a print render target that includes an instructions converter and an object-model creator. The method further includes routing the DIRECT2D instructions to the print render target in parallel with print-formatting instructions. Moreover, the instructions converter maps the DIRECT2D instructions to the print-rendering instructions. The object-model creator combines the print-rendering instructions with the print-formatting instructions to create a print-instructions object model. The print-instructions object model is transferred to a stream to facilitate serialization, and the stream is communicated to a print application programming interface.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

We claim:

1. A method of converting display-rendering instructions of a document into print-rendering instructions, the method comprising:
    receiving a request to print the document that is displayable on an output device when the display-rendering instructions of the document are executed and that is divisible into a plurality of pages for printing;
    creating a print render target that includes an instructions converter;
    routing the display-rendering instructions of the document to the print render target together with print-formatting instructions, which define pagination of the plurality of pages;
    mapping by the instructions converter a first portion of the display-rendering instructions to a first set of print-rendering instructions that is directed to a first page of the plurality of pages, wherein the display-rendering instructions includes a second portion that, when converted to a second set of print-rendering instructions, is directed to another page of the plurality of pages;
    packaging the first set of print-rendering instructions with a respective set of print-formatting instructions for the first page into a first print-instructions object model, wherein the print-instructions object model does not include the second set of print-rendering instructions directed to the other page, which is packaged into a second print-instructions object model; and
    communicating the first print-instructions object model to a print application programming interface (API), wherein the first print-instructions object model is sent to the print API independently of the second print-instructions object model, and
    wherein the first and second print-instructions object models include print-rendering instructions for completing a same print job directed to printing the document.

2. The method of claim 1, wherein the print-rendering instructions include an Enhanced Metafile format, a Windows Metafile format, a Scalable Vector Graphics format, an XML Paper Specification format, or a combination thereof.

3. The method of claim 1, wherein the first print-instructions object model is serialized in a stream, which is sent to the print API.

4. The method of claim 1 further comprising, transforming at least a portion of the display-rendering instructions into a bitmap.

5. The method of claim 4, wherein the bitmap is combined with the first set of print-rendering instructions in the first print-instructions object model.

6. The method of claim 1 further comprising, routing GDI instructions to the print render target in parallel with the display-rendering instructions.

7. The method of claim 6, wherein the GDI instructions are mapped to additional print-rendering instructions, which are combined with the print-rendering instructions mapped from the display-rendering instructions.

8. A computing device having a processor and memory storing various modules, which perform operations for converting display-rendering instructions of a webpage into print-rendering instructions of a webpage comprising:
    receiving a request to print the webpage that is divisible into a plurality of pages when printed and that is displayable on an output device when the display-rendering instructions are executed;
    creating a print render target that includes an instructions converter;
    routing the display-rendering instructions to the print render target together with print-formatting instructions, which define subsets of the plurality of pages into which the webpage is divided for printing;
    mapping by the instructions converter a first portion of the display-rendering instructions to a first set of print-rendering instructions directed to a first subset of the plurality of pages, wherein the display-rendering instructions include a second portion that, when converted to a second set of print-rendering instructions, is directed to a second subset of the webpage;
    executing a webpage-level print ticket by packaging the first set of print-rendering instructions with a respective set of print-formatting instructions for the first subset into a first print-instructions object model, which does not include the second set of print-rendering instructions directed to the second subset, wherein the second set of print-rendering instructions is packaged into a second print-instructions object model when the webpage-level print ticket is executed; and
    printing the webpage by streaming the first print-instructions object model to a print application programming interface (API) independently of the second print-instructions object model, wherein the first print-instructions object model and the second print-instructions object model are included in the webpage-level print ticket and are sent to the print API separately.

9. The method of claim 1 further comprising,
    receiving a first-start page command;
    triggering the packaging of the first set of print-rendering instructions with the respective set of print-formatting instructions for the first page into the first print-instructions object model when the first start-page command is received;

receiving a first end-page command; and communicating the first print-instructions object model to the print API when the first end-page command is received and without waiting for an end-document command.

10. A computer-memory device storing computer-executable instructions that, when executed, perform operations for converting display-rendering instructions of a webpage into print-rendering instructions of a webpage comprising:

receiving a request to print the webpage that is divisible into a plurality of pages when printed and that is displayable on an output device when the display-rendering instructions are executed;

creating a print render target that includes an instructions converter;

routing the display-rendering instructions to the print render target together with print-formatting instructions, which define subsets of the plurality of pages into which the webpage is divided for printing;

mapping by the instructions converter a first portion of the display-rendering instructions to a first set of print-rendering instructions directed to a first subset of the plurality of pages, wherein the display-rendering instructions include a second portion that, when converted to a second set of print-rendering instructions, is directed to a second subset of the webpage;

executing a webpage-level print ticket by packaging the first set of print-rendering instructions with a respective set of print-formatting instructions for the first subset into a first print-instructions object model, which does not include the second set of print-rendering instructions directed to the second subset, wherein the second set of print-rendering instructions is packaged into a second print-instructions object model when the webpage-level print ticket is executed; and printing the webpage by streaming the first print-instructions object model to a print application programming interface (API) independently of the second print-instructions object model, wherein the first print-instructions object model and the second print-instructions object model are included in the webpage-level print ticket and are sent to the print API separately.

* * * * *